G. W. COLLIN.
REGULATING VALVE.
APPLICATION FILED MAY 17, 1912.
1,101,617.
Patented June 30, 1914.
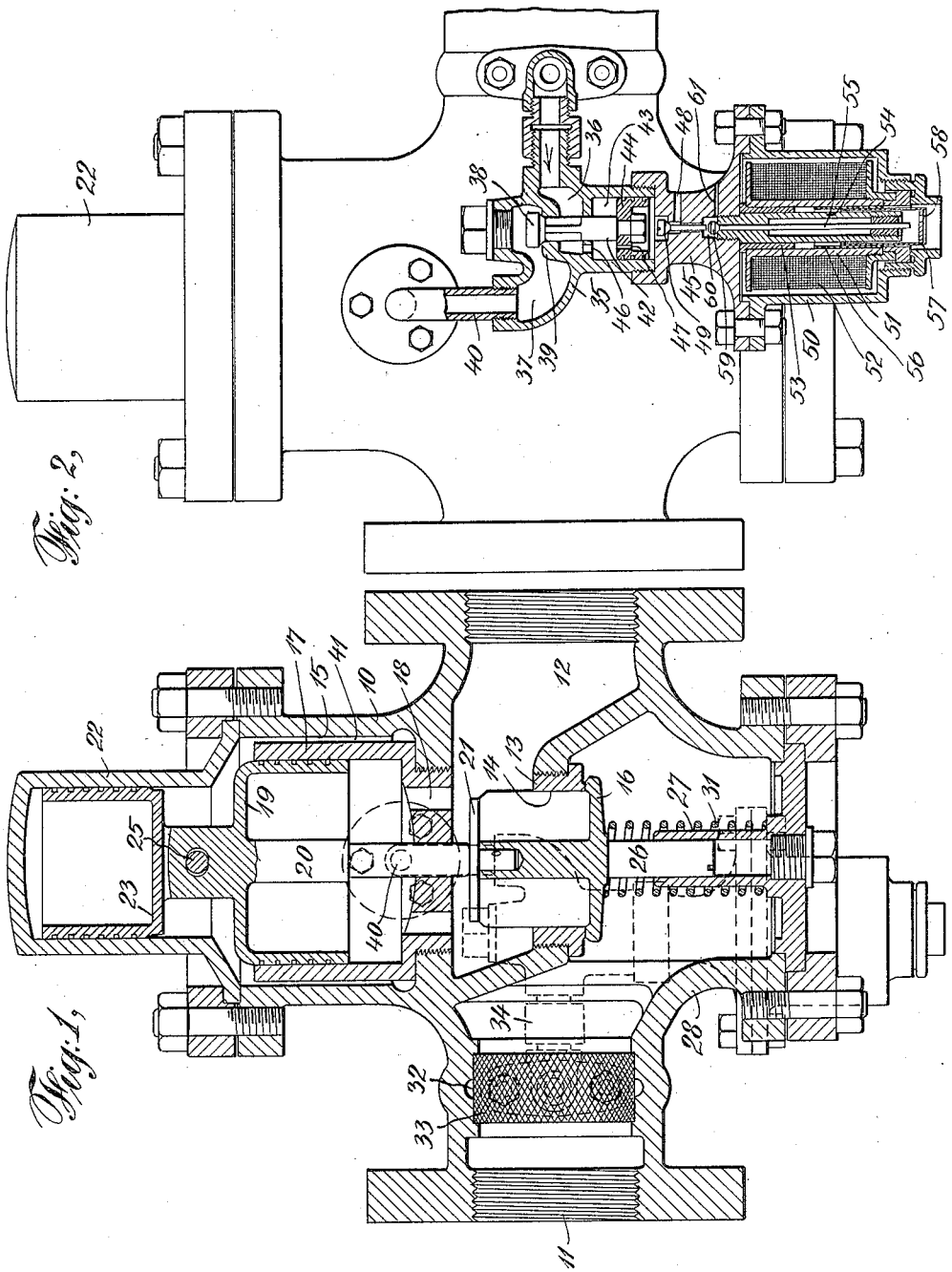
Witnesses:
Max B. A. Doring
Paul H. Frank
Inventor
George W. Collin
By his Attorneys
Marble & Matty

UNITED STATES PATENT OFFICE.

GEORGE W. COLLIN, OF BRIDGEPORT, CONNECTICUT, ASSIGNOR TO THE COLLIN VALVE COMPANY, OF BRIDGEPORT, CONNECTICUT, A CORPORATION OF MAINE.

REGULATING-VALVE.

1,101,617.     Specification of Letters Patent.     Patented June 30, 1914.

Application filed May 17, 1912. Serial No. 697,391.

*To all whom it may concern:*

Be it known that I, GEORGE W. COLLIN, a citizen of the United States of America, and a resident of Bridgeport, county of Fairfield, and State of Connecticut, have invented certain new and useful Improvements in Regulating-Valves, of which the following is a specification.

This invention relates to structurally separate pilot valves for regulating valves, particularly pressure reducing valves, of the general type set forth in my Patent No. 949,294, and in my application Sr. No. 653,802, filed October 10, 1911, which valves comprise a main valve, fluid-pressure-actuated means for operating said valves, and a pilot valve, controlled by fluid-pressure or otherwise, for controlling the operation of the fluid-pressure-actuated operating-means of the main valve. In the case of very large regulating valves, and particularly regulating valves the valve-bodies of which are of steel or iron, it is not convenient to locate the pilot valve within the main valve-body, and the regulating valve herein described comprises a pilot valve located within a pilot-valve body structurally separate from the main valve body, but connected thereto by suitable pipe connections.

In the valve herein described, the pilot valve is itself operated by fluid-pressure-actuated means, controlled by a secondary pilot valve, the latter being controlled by an electro-magnet, which in the construction illustrated herein is of the solenoid type.

The valve herein involves certain features of the valve set forth in my companion application for Letters Patent Ser. No. 697,890, filed May 17, 1912.

My invention consists in the novel construction of the pilot valve and in the novel electrically-controlled fluid-pressure-actuated means for operating said pilot valve.

The object of my invention is to facilitate the construction of electrically-controlled regulating valves of large sizes having their valve bodies formed of iron or steel or in which, for other reasons, it is not desirable to include the pilot valve within the body of the main valve.

I will now proceed to describe my invention with reference to the accompanying drawings, and will then point out the novel features in claims.

In the drawings: Figure 1 shows a central vertical section of the main valve body, main valve, and fluid-pressure-actuated operating means thereof, the pilot valve being indicated in dotted lines. Fig. 2 shows a side elevation of the main valve (showing, in fact, the side which is in rear in Fig. 1) and showing in central vertical section the pilot valve, the fluid-pressure-actuated operating means thereof, and the solenoid magnet and associated parts for operating the secondary pilot valve.

Referring first to Fig. 1, 10 designates the main valve body, 11 the inlet thereof, and 12 the outlet thereof. The inlet and outlet, as shown, are threaded in the usual manner for connection to steam pipes and the like. This valve body or casing is shown as provided with the usual division wall separating the inlet and outlet chambers of the valve body, and including a transverse ported partition in which is removably secured a ported valve seat bushing 13 for the main valve. Numeral 14 designates the port of this bushing, which is the main valve port, and 16 designates the main valve for closing this port 14.

On the outlet side of the valve body but with its axis preferably in line with the axis of the valve port 14, there is a piston chamber 15 provided with a liner 17 having suitable openings 18 whereby the interior of said liner is connected with the outlet chamber of the valve body. The bore of this liner 17 is smoothly finished to receive the piston 19, said piston being designed to move axially in said liner. Said piston is provided with a stem 20, passing through a suitable guide opening in the inner end of liner 17, and this stem at its end bears against a plate 21 provided on the outlet side of the valve 16.

At its outer end the piston chamber 15 is provided with a removable hollow end cap 22, having within it a cushion cylinder in which works a cushion piston 23 having a laterally free pivotal connection to piston 19, 25 being the pivot pin. The pivotal connection between the cushion piston and the piston 19 allows each piston to follow freely its respective bore so that no cramping of either piston may occur. The main valve 16 is provided with a centrally projecting stem 26 fitted to move in the bore of a guide 27 seated in the end of extension 28 of the valve body. A spring 31 surrounds the guide 27 and bears against the valve 16, which spring tends to hold said valve seated, although the pressure of fluid, acting upon the back of the valve 16, will hold said valve closed normally, even though this spring 31 should break, and if valve 16 should be open the fluid flowing through the valve port 14 and acting upon plate 21, will close the valve 16, unless such closure be prevented by the action of piston 19.

33 designates a cylindrical strainer located in the inlet chamber 11 of the valve body, and guarding an annular recess 32 in the wall of such inlet chamber, from which recess 32 a suitable pipe connection 34 leads to the pilot valve.

As so far described the valve is of substantially the construction set forth in my application Sr. No. 653,802.

Referring now to Fig. 2, 35 designates the body of the pilot valve structure, and 38 designates a puppet pilot valve therein, normally seated against a ported division wall 39, intermediate an inlet chamber 36 and an outlet chamber 37, the outlet chamber being connected by a pipe connection 40 with the annular space 41 between cylinder 15 and liner 17 of the main valve. The stem 42 of the pilot valve has a suitable sliding bearing in the pilot valve body 35, and on the lower end of this stem is an operating piston 44 adapted to move within a cylinder 43 formed in the pilot valve body 35. The lower end of this cylinder 43 is closed by a bonnet 45 from which bonnet the solenoid, hereinafter more particularly described, is supported. A port 46 connects the inlet chamber 36 of the pilot valve body 35, with the upper end of cylinder 43, and a smaller port 47 in piston 44 connects the upper end of the cylinder 43 with the lower end of that cylinder. The bonnet 45 is provided with a vent 48 for the lower end of cylinder 43, and a secondary puppet pilot valve 49 is adapted to close this vent 48.

50 designates a casing suspended from the bonnet 45, and 51 designates a solenoid spool within said casing, upon which spool are the magnet windings 52. This solenoid is of the construction set forth in my Patent No. 1,033,543, dated July 23, 1912, and comprises a core of magnetic metal 53, within the spool, a guide tube 54 within said core 53 and provided with a sliding bearing for a slide rod 55, a sliding hollow armature 56 and a liner 57 of non-magnetic material, such as brass, secured to the armature and provided at its lower end with a bridge 58 adapted to engage the lower end of the slide rod 55, when the armature 56 is attracted, and so to raise said slide rod 55. The slide rod, when so raised, engages the secondary pilot valve 49 and lifts the same. The upper end of this slide rod 55 is provided with a valve head, 59, working in a chamber 60, said valve head 59 preventing moisture from flowing down along the slide rod into the interior of the guide tube; for either said valve head is seated against the top of the guide tube 54, or it is seated against the upper wall of chamber 60, closing the bore of the bonnet 45 in which the stem of secondary pilot valve 49 lies. A vent 61 permits free escape from chamber 60. The operation of this valve is as follows: Supposing that the solenoid be deënergized, pressure communicated from the inlet chamber of the main valve body through duct 34, and inlet chamber 36 of the pilot valve is communicated through port 46 to the upper side of piston 44 and also through port 47 in said piston to the lower side of said piston. If valve 49 controlled by the solenoid be closed, the pressure on the under side of the piston 44 exceeds the pressure on the upper side of said piston, since, because of the presence of the valve stem 42 on the upper side of the piston, the effective area of the upper side of the piston is less than that of the lower side of the piston. The effective pressure on the lower side of the piston being therefore greater than that on the upper side of the piston, the piston is forced up, opening valve 38.

When the solenoid is energized its armature 56 is raised, and the liner 57 of said armature raises the slide rod 55, opening the secondary pilot valve 49, and so permitting the fluid on the under side of the piston to escape through vent 48, the pressure on the upper side of the piston then forcing said piston down and causing pilot valve 42 to close the port in the division wall 39; whereupon the pressure on the upper side of the main valve piston 19 will decrease, through leakage or condensation, and the pressure in the outlet chamber 12 of the main valve body will cause the piston 19 to rise, so permitting the main valve 16 to close. The vent 48 remains open so long as the solenoid is energized; but when said solenoid is deënergized the armature drops, secondary pilot valve 49 closes, pressure builds up on the under side of piston 44, until such pressure exceeds the pressure on the effective upper side of said piston, causing said piston to rise and to open valve 38, as previously described.

The electrically controlled valve herein described is adapted for various uses, for example, the circuit of the solenoid may be controlled by a thermostat; in which case the valve is adapted for heat regulation; or, the circuit of the solenoid may be controlled by a pressure-actuated contact device, in which case the valve is adapted for pressure regulation; or, the circuit of the solenoid may be controlled by a speed-governor-controlled contact device in which case the valve is adapted for use for controlling speed of engines, and particularly for limiting the speed of an engine.

In an application for Letters Patent filed October 10, 1911, Serial No. 653,803, I have described and claimed a valve controlled by fluid-pressure-actuated means, controlled by a solenoid magnet. The valve herein illustrated and described embodies an improvement thereon and modification of the valve of the said application Serial No. 653,803.

What I claim is:—

1. A structurally separate pilot valve for fluid-pressure-operated regulating valves such as described, comprising a valve body having a flow passage with inlet and outlet connections, and a ported division wall between said inlet and outlet connections dividing said flow passage into inlet and outlet chambers, a valve controlling the flow through the port of such division wall, such valve seated on the outlet side of such division wall and arranged to open in the direction of flow of steam through the port of such division wall, and having a projecting stem, a cylinder formed in such valve body into which cylinder said valve stem projects, a piston located in said cylinder and mounted on said valve stem, a port connecting the two ends of said cylinder, a port connecting that end of the said cylinder in which is the said valve stem with the inlet chamber of said valve body, a bonnet forming a head for the other end of said cylinder, and having in it a vent for such end of that cylinder, a secondary pilot valve controlling flow through such vent, and means carried by said bonnet for operating said secondary pilot valve.

2. A structurally separate pilot valve for fluid-pressure-operated regulating valves such as described, comprising a valve body having a flow passage with inlet and outlet connections, and a ported division wall between said inlet and outlet connection dividing said flow passage into inlet and outlet chambers, a valve controlling the flow through the port of such division wall, such valve seated on the outlet side of such division wall and arranged to open in the direction of flow of steam through the port of such division wall, and having a projecting stem, a cylinder formed in such valve body into which cylinder said valve stem projects, a piston located in said cylinder and mounted on said valve stem, a port connecting the two ends of said cylinder, a port connecting that end of said cylinder in which is the said valve stem with the inlet chamber of said valve body, a bonnet forming a head for the other end of said cylinder, and having in it a vent for such end of that cylinder, a secondary pilot valve controlling flow through such vent, and a magnet and means operated thereby, carried by said bonnet, for operating said pilot valve.

In testimony whereof I have signed this specification in the presence of two subscribing witnesses.

GEORGE W. COLLIN.

Witnesses:
JOHN J. KANE,
WALTER W. SMITH.

Copies of this patent may be obtained for five cents each, by addressing the "Commissioner of Patents, Washington, D. C."